US011864017B2

(12) United States Patent
Ozozlu et al.

(10) Patent No.: US 11,864,017 B2
(45) Date of Patent: Jan. 2, 2024

(54) SELECTIVE RETRANSMISSION METHOD FOR UPLINK OVERHEAD REDUCTION

(71) Applicant: T-Mobile Innovations LLC, Overland Park, KS (US)

(72) Inventors: Akin Ozozlu, McLean, VA (US); Nagi A. Mansour, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/689,243

(22) Filed: Mar. 8, 2022

(65) Prior Publication Data

US 2023/0292163 A1     Sep. 14, 2023

(51) Int. Cl.
*H04L 1/08*      (2006.01)
*H04W 24/10*  (2009.01)
*H04L 1/1812* (2023.01)
*H04B 17/336* (2015.01)

(52) U.S. Cl.
CPC .......... *H04W 24/10* (2013.01); *H04B 17/336* (2015.01); *H04L 1/08* (2013.01); *H04L 1/1812* (2013.01)

(58) Field of Classification Search
CPC .............................. H04L 1/1825; H04L 1/1861
See application file for complete search history.

(56) References Cited

U.S. PATENT DOCUMENTS

| | | | |
|---|---|---|---|
| 9,615,329 B2 | 4/2017 | Tabet et al. | |
| 9,853,753 B2 * | 12/2017 | Lu | H04W 72/23 |
| 10,924,163 B2 | 2/2021 | Dayvdov et al. | |
| 2010/0281322 A1 * | 11/2010 | Park | H04L 1/0001 714/E11.131 |
| 2011/0016369 A1 * | 1/2011 | Bergman | H04L 1/1816 714/776 |
| 2011/0223962 A1 * | 9/2011 | Kuwahara | H04W 16/30 455/522 |
| 2011/0317642 A1 * | 12/2011 | Eravelli | H04L 49/90 370/329 |
| 2014/0274196 A1 * | 9/2014 | Dai | H04W 52/242 455/522 |
| 2015/0092645 A1 * | 4/2015 | Tabet | H04L 1/1812 370/311 |

(Continued)

FOREIGN PATENT DOCUMENTS

WO     2016163855 A1     10/2016

OTHER PUBLICATIONS

Ahmed et al., "Overhead reduction of NR Type II CSI for NR Release 16." WSA 2019; 23rd International ITG Workshop on Smart Antennas VDE, (pp. 1-5) (Apr. 2019).

*Primary Examiner* — Zhiren Qin
(74) *Attorney, Agent, or Firm* — Jones Robb, PLLC

(57) ABSTRACT

Systems and methods are provided for an improved link budged resulting from reduced overhead. The method includes determining a signal to noise and interference ratio (SINR) at a wireless device, comparing the SINR to a predetermined threshold and determining the SINR at the wireless device meets the predetermined threshold. The method additionally includes disabling a hybrid automatic repeat request (HARQ) retransmission mechanism for the wireless device based on the determination that the SINR at the wireless devices meets the predetermined threshold.

18 Claims, 6 Drawing Sheets

(56) References Cited

U.S. PATENT DOCUMENTS

| | | | |
|---|---|---|---|
| 2015/0358194 A1* | 12/2015 | Yu | H04L 1/0009 |
| | | | 370/329 |
| 2018/0083738 A1* | 3/2018 | Yi | H04L 1/1887 |
| 2018/0227862 A1* | 8/2018 | Liu | H04W 72/21 |
| 2022/0183018 A1* | 6/2022 | Wang | H04W 72/0446 |
| 2022/0224449 A1* | 7/2022 | Shrestha | H04W 72/23 |
| 2022/0346049 A1* | 10/2022 | Liu | H04L 5/0053 |

\* cited by examiner

US 11,864,017 B2

SELECTIVE RETRANSMISSION METHOD FOR UPLINK OVERHEAD REDUCTION

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology. Access to high data speeds is improved if a high signal to interference and noise ratio (SINR) is present. Accordingly, when a wireless device moves further from an antenna, the wireless device is likely to experience a decrease in quality of service (QoS).

In order to avoid prolonged decreases in QoS or other performance parameters, wireless devices periodically send channel status information (CSI) reports to an access node in the network. The CSI report tells the access node how good or bad a channel is at a specific time. The CSI report may contain for example, a channel quality indicator (CQI), a precoding matrix index (PMI), and a rank indicator (RI), CSI-RS Resource Indicator (CRI), SS/PBCH Resource Block Indicator (SSBRI), and layer indicator (LI) as well as other measurements. Often, the wireless devices report in a periodic time interval configured by a higher layer. While more frequent CSI reporting can improve QoS for a wireless device, it also increases overhead on wireless communications links.

Furthermore, in order to increase transmission reliability in wireless communications, systems employ retransmission mechanisms such that wireless devices can request retransmission of information which is either not received or cannot be properly decoded. For example, UEs and access nodes such as gNodeBs may employ a hybrid automatic repeat request (HARQ) mechanism. In HARQ, a sender, such as a gNodeB, can be requested by a receiver, such as a UE or wireless device, to retransmit a package when a previous transmission attempt was unsuccessful. HARQ systems utilize forward error correction (FEC) information, which increases transmission accuracy at the cost of transmission efficiency due to the increased overhead on the wireless communication link.

Thus, existing systems for improving reliability and QoS for wireless devices often result in excessive overhead on wireless communication links. Accordingly, a solution is needed that maintains QoS and reliability for wireless devices while reducing the excessive overhead created by existing processes for improving reliability and maintaining QoS.

Overview

Exemplary embodiments described herein include systems, methods, and non-transitory computer readable mediums for reducing uplink overhead by selecting a retransmission mechanism. An exemplary method includes determining a signal to noise and interference ratio (SINR) at a wireless device, comparing the SINR to a predetermined threshold, an determining the SINR at the wireless device meets the predetermined threshold. The method additionally includes disabling a hybrid automatic repeat request (HARQ) retransmission mechanism for the wireless device.

An additional exemplary embodiment includes an access node having at least one processor for performing multiple operations. The operations include determining a signal to noise and interference ratio (SINR) at a wireless device, comparing the SINR to a predetermined threshold, and determining the SINR at the wireless device meets the predetermined threshold. The operations additionally include disabling a hybrid automatic repeat request (HARQ) retransmission mechanism for the wireless device in response to the determination that the SINR meets the predetermined threshold.

Yet an additional exemplary embodiment includes a non-transitory computer readable medium, programmed to perform multiple operations. The operations include comparing a SINR at a wireless device to a predetermined SINR threshold and utilizing a HARQ retransmission mechanism for the wireless device when the SINR does not meet the predetermined SINR threshold. The operations additionally include disabling the HARQ retransmission mechanism for the wireless device when the SINR meets the predetermined SINR threshold.

DETAILED DESCRIPTION

Figure 1:
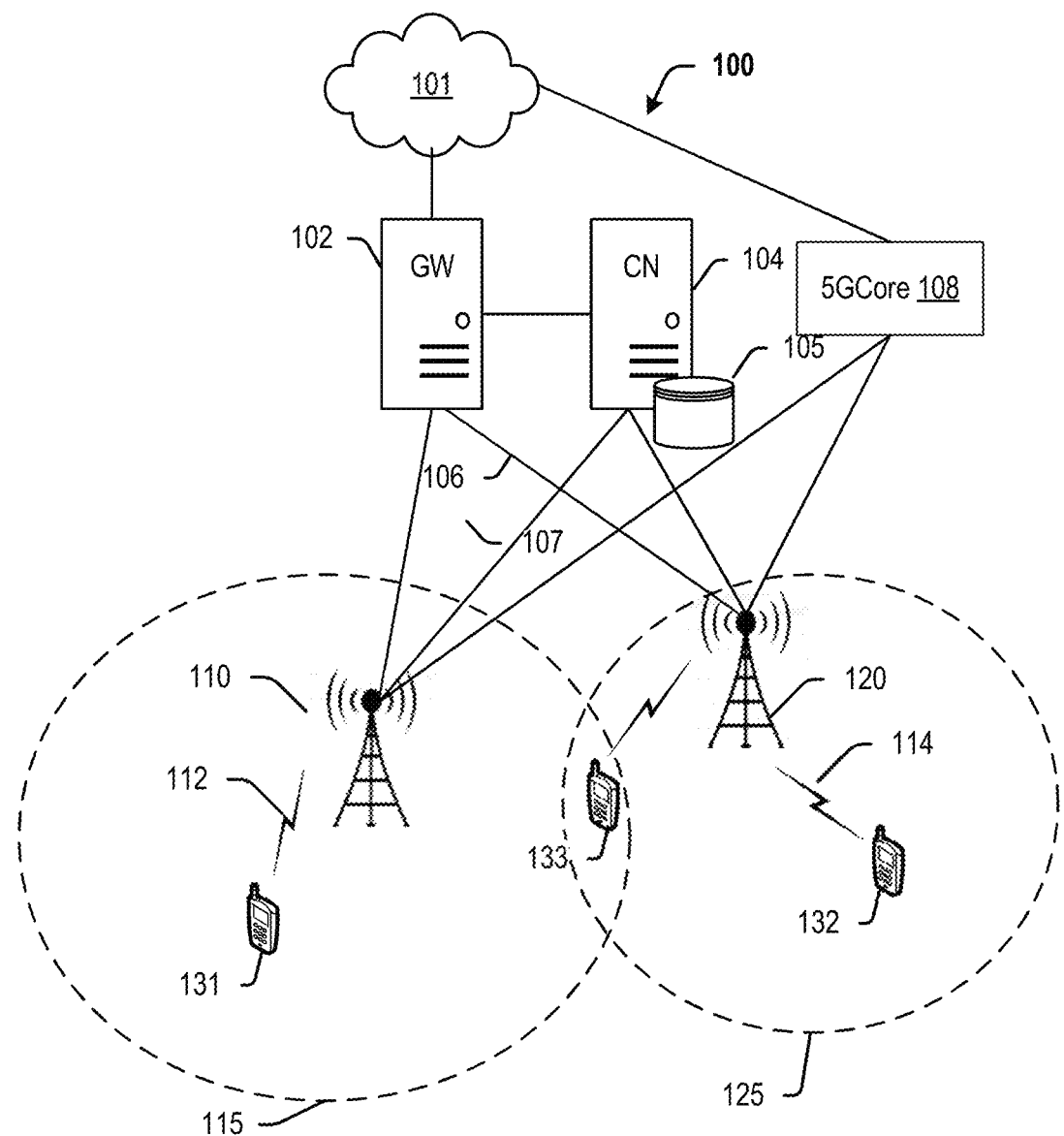
FIG. 1 depicts an exemplary system for wireless communication, in accordance with the disclosed embodiments.

Exemplary embodiments described herein include systems, methods, and computer readable mediums for reducing uplink overhead by dynamically selecting a retransmission method. In particular, embodiments set forth herein include enhanced logic for evaluating a performance parameter for a wireless device in comparison to a threshold and dynamically selecting a retransmission mode for the wireless device based on whether the performance parameter meets a particular threshold.

In embodiments provided herein, enhanced logic dynamically disables a HARQ retransmission mechanism for a wireless device, when the performance parameter meets a predetermined threshold. When the HARQ retransmission mechanism is disabled, the wireless device may utilize retransmission mechanism from a higher layer, such as a radio link control (RLC) retransmission mechanism. While the RLC retransmission mechanism is slower than the HARQ retransmission mechanism, it does not create as much uplink overload as the HARQ retransmission mechanism. Additionally, wireless devices may utilize a PDCP retransmission mode as an alternative in some circumstances, particularly when a handover threshold has been met.

Thus, in embodiments set forth herein, a dynamic media access control (MAC) HARQ based mechanism is provided so that if the performance of a UE meets a predetermined threshold, HARQ is paused and the wireless device relies on RLC and/or other upper protocol level retransmissions. Accordingly, wireless devices within a certain proximity to an access node will typically have the HARQ mechanism disabled. Wireless devices further from the access node that do not meet the performance threshold will continue to utilize MAC HARQ retransmissions. Thus, for example, wireless devices with lower downlink SINR will carry on with standard MAC level HARQ retransmission mechanism. Methods and systems described herein thereby reduce uplink overload on the physical shared uplink channel (PUSCH) for high downlink rates, such as for example, 50 Mbps or 100 Mbps or 1000 Mbps streams. Further, the process described herein serves to conserve battery and processing power for wireless devices and improve latency.

In embodiments disclosed herein, a cell or wireless network may be provided by an access node. The access node may utilize one or more antennas to communicate with wireless devices or UEs. Performance at a particular wireless device may be dependent on a number of factors including, for example, signal strength parameters and interference indicators. Values such as signal to interference and noise ratio (SINR), reference signal received power (RSRP), reference signal received quality (RSRQ) or other measurements may be periodically measured and reported by the wireless devices over a communication network to an access node. Additional signal performance parameters may be reported, including, for example, channel quality indicator (CQI), and rank index (RI).

In particular, embodiments disclosed herein include an improved method for minimizing uplink overhead that results in conservation of battery and processing power and improved overall performance for network devices. By selecting a particular retransmission method based on performance parameters of the wireless device, performance is maintained for wireless devices in the network and uplink overhead and latency are reduced. Other triggers may alternatively be utilized as the performance of a wireless device may be dependent on a number of factors including, for example, antenna performance parameters, network loading conditions, and wireless device location within a cell or a sector.

Thus, as described herein, detecting the triggering event may include detecting a signal strength meeting a predetermined threshold. For example, received signal received power (RSRP) or SINR at the wireless device may diminish to a level such that the connection is interrupted. However, when wireless devices move closer to an access node and no interference is present, the signal strength increases. When signal strength for a wireless device meets a predetermined network defined threshold, HARQ may be disabled. Further, the signal strength may be monitored on a continual basis, such that when the signal strength for the wireless device deteriorates, HARQ may again be enabled.

In embodiments set forth herein, the network may be a 4G LTE network 5G NR network or a combined 4G/5G network. Other networks are within scope of the disclosure. Wireless devices may travel throughout the network measuring and reporting performance parameters. Methods performed herein may be performed in response to the receipt and processing of measured performance parameters from the wireless devices. The access node, for example a gNodeB, may signal the wireless device and instruct it to completely eliminate mac HARQ and run on RLC and upper level retransmission mechanisms only.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, or gNodeB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of for selecting retransmission methods may be implemented as computer-readable instructions or methods and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, 5G core 108, access nodes 110 and 120, and wireless devices 131, 132, and 133. Access node 110 is illustrated as having a coverage area 115, and access node 120 is illustrated as having a coverage area 125. As illustrated, the coverage area 115 may be larger than the coverage area 125. This may result from the access node 110 having higher power transmission capabilities than the access node 120. For example, the access node 120 may be capable of a 320 W downlink transmission power and the access node 120 may be capable of a 120 W downlink transmission power.

Wireless device 131 is located within coverage area 115 and accesses network services using a wireless communication link 112 from access node 110. Wireless device 132 is located within coverage area 125 and accesses network services from access node 120 via another wireless communication link 114. Further, wireless device 133 is located within overlapping coverage area formed by an overlap of coverage areas 115, 125. For example, access nodes 110, 120 may be configured to deploy individual sectors and the overlapping coverage area may comprise any overlapping coverage area of the sectors. The wireless devices 131, 132, and 133 may travel between the coverage areas 115 and 125, thus being variously connected to access nodes 110 and 120.

In the illustration of FIG. 1, both the first access node 110 and the second access node may be connected to the communication network 101 via both an LTE path (including the gateway node 102) and an NR path (including the 5G core 108). However, in practical implementations one or both of the first access node 110 and the second access node 120 may be connected to the communication network 101 via only a single RAT path. In any event, the first access node and the second access node 110, 120 communicate with the gateway node 102, the controller node 104, and/or the 5G core 108 via respective communication links, each of which may be a direct link (e.g., an X2 link or the like).

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, gNodeBs, eNodeBs, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as location information for overlapping coverage area 135, positions of wireless devices 131, 132, 133, transmission power capabilities, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Further, a scheduling entity (within, for example, one or both of access nodes 110, 120, or controller node 104) may be configured to allocate resources and select a retransmission method in accordance with embodiments set forth herein, thereby improving wireless device performance throughout the coverage area.

The core 108 may be a 5G core collectively implementing several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 108. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 108, thereby terminating RAN control plane and UE traffic originating on either the N1 or N2 reference interface. In the 5G core 108, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
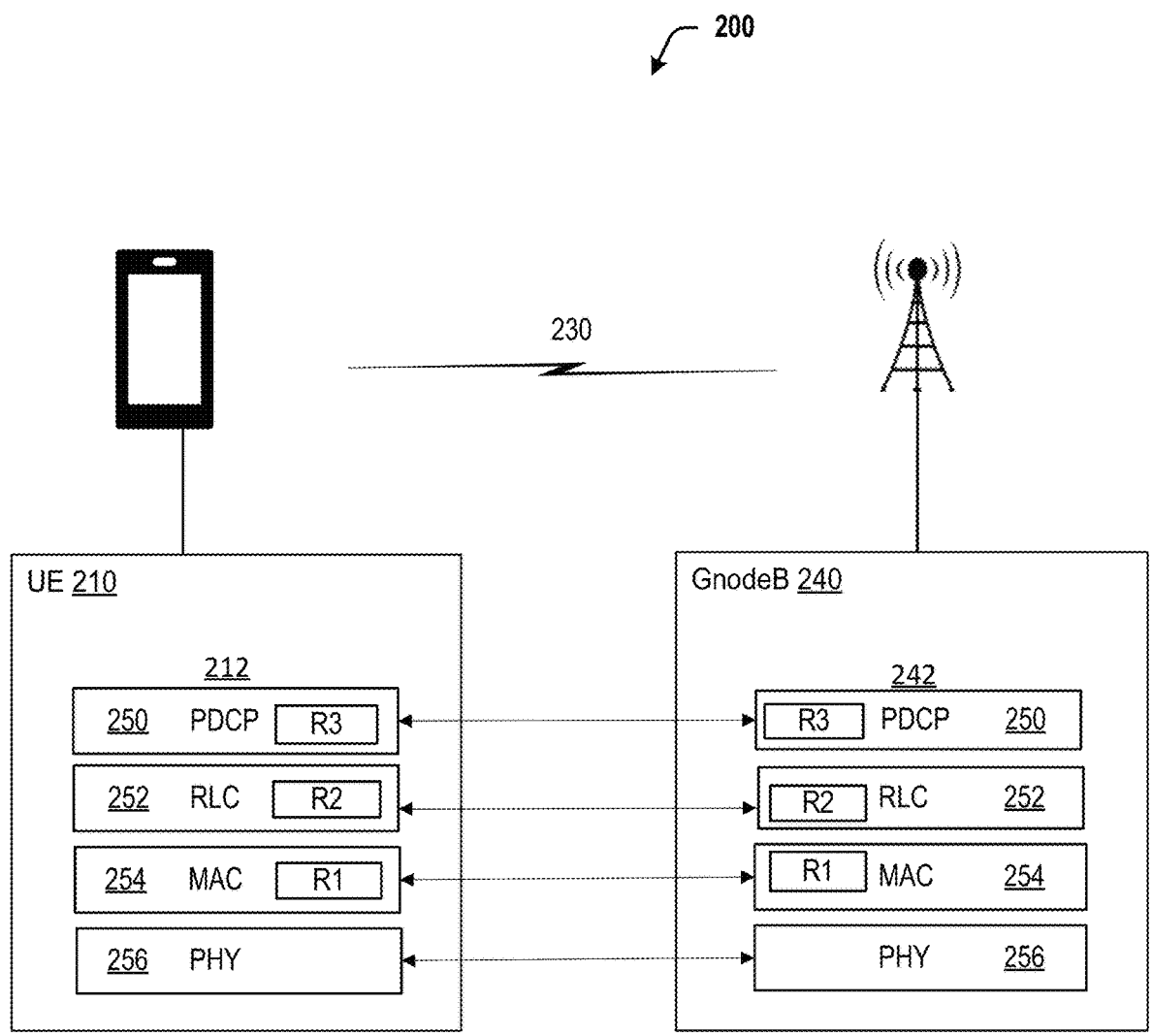
FIG. 2 illustrates an exemplary configuration of retransmission mechanisms available for a wireless device in accordance with disclosed embodiments.

FIG. 2 illustrates an exemplary configuration of retransmission mechanisms available for a wireless device in accordance with disclosed embodiments. A wireless device 210 communicates over a communication link 230 with an access node 240, which may, for example be gNodeB. Wireless device 210 and gNodeB 240 may implement protocol stacks 212 and 242. The protocol stack is a set of protocols used in a communications network and includes a hierarchy of software layers residing in each client and server. Although only four layers are illustrated, other layers (not shown) may be present. In the illustrated embodiments, a packet data convergence protocol (PDCP) layer 250 is on top of the protocol stack. A radio link control (RLC) layer 252 sits below the PDCP layer 250. A MAC layer 254 sits below the RLC layer 252 and a physical (PHY) layer 256 sits below the MAC layer 256.

The PHY layer 256 provides services to the MAC layer and supports downlink (gNodeB-to-UE), uplink (UE-to-gNodeB) and side link (UE-to-UE) communications. Of the other illustrated layers, each has a retransmission mechanism. A first retransmission mechanism RI resides in the MAC layer 254. A second retransmission mechanism R2 reside at the RLC layer 252. A third retransmission mechanism R3 resides in the PDCP layer 250.

The MAC layer 254 implements R1, or HARQ, which is the fastest of the three illustrated retransmission systems. In 5G NR, HARQ may have a delay of less than 1 ms. NR uses an asynchronous HARQ protocol in both downlink and uplink, that is, the HARQ process which the downlink or uplink transmission relates to is explicitly signaled as part of the downlink control information (DCI). The HARQ mechanism in the MAC layer targets very fast retransmissions and, consequently, feedback on success or failure of the downlink transmission is provided to the gNodeB 240 after each received transport block. For uplink transmission, no explicit feedback is required as the receiver and scheduler are in the same node. HARQ is implemented to correct the erroneous packets coming from PHY layer. If the received data is erroneous, then the receiver or wireless device 210 buffers the data and requests a re-transmission from the sender. When the receiver receives the re-transmitted data, it then combines it with buffered data prior to channel decoding and error detection. The sending entity buffers the transmitted data until the acknowledgement (ACK) is received because the data needs to be retransmitted in case a negative acknowledgement (NACK) is received. Thus, HARQ is a stop and wait (SAW) protocol with multiple processes and these can create excessive overhead.

The RLC layer 252 provides error-free delivery of data to higher layers. To accomplish this, a retransmission mechanism R2 operates between the RLC entities in the receiver and transmitter. By monitoring sequence numbers indicated in headers of incoming protocol data units (PLUs), the receiving RLC can identify missing PDUs (the RLC sequence number is independent of the PDCP sequence number). Status reports are fed back to the transmitting RLC entity, requesting retransmission of missing PDUs. Based on the received status report, the RLC entity at the transmitter can take the appropriate action and retransmit the missing PDUs if seeded.

Although the RLC retransmission mechanism R2 is capable of handling transmission errors due to noise and unpredictable channel variations, error-free delivery is in most cases handled by the MAC-based HARQ protocol R1. However with HARQ, there is potential for errors in the feedback system. RLC 252 has a slower retransmission system for dealing with these errors but with a feedback protected by cyclic redundancy checks (CRC). Compared to the HARQ acknowledgments, the RLC status reports are transmitted relatively infrequently. Thus, the RLC retransmission mechanism R2 is slower but more reliable than MAC HARQ retransmissions.

The PDCP layer 250 supplies the retransmission mechanism R3. R3 guarantees in-sequence delivery of user data and is mainly used during handover as RLC and MAC buffers are flushed when a handover is executed.

In embodiments described herein, R1 or HARQ, in the MAC layer, may be used as a default retransmission mechanism. However, the access node 240 may selectively disable HARQ based on a comparison of a stored performance threshold to measured performance parameters from the wireless device 210. When HARQ is disabled, the wireless device 210 may utilize R2 or R3.

Figure 3:
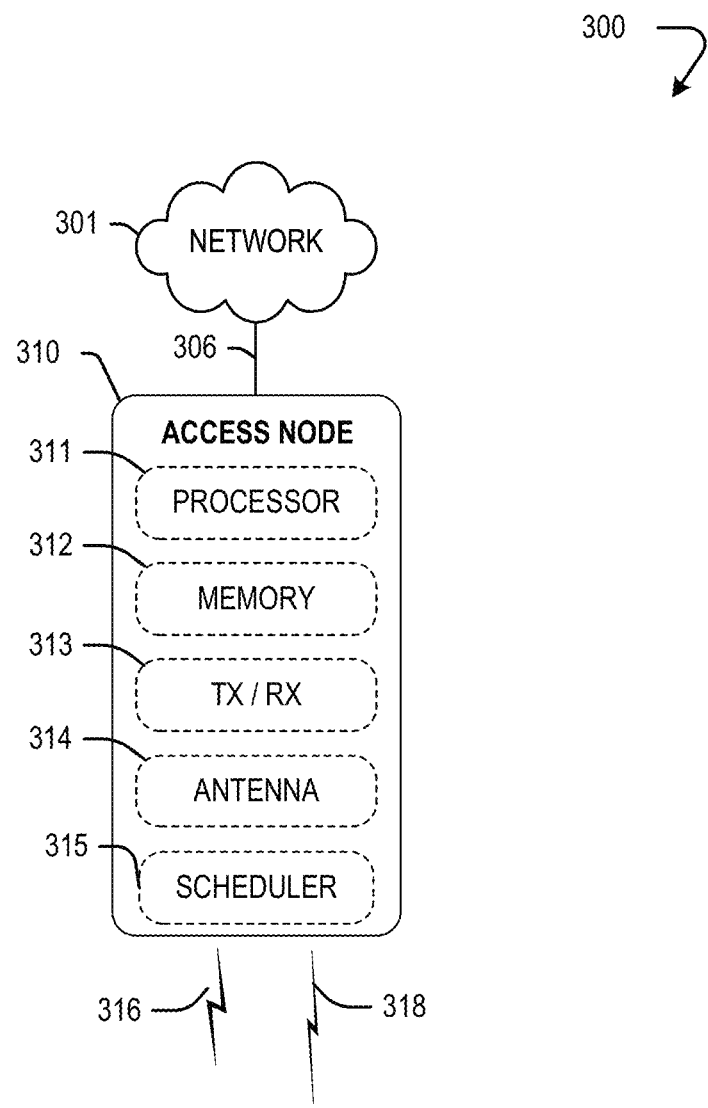
FIG. 3 depicts an access node in accordance with disclosed embodiments.

FIG. 3 depicts an access node 310 in accordance with the disclosed embodiments. In exemplary embodiments, access node 310 can include, for example, a gNodeB or an eNodeB. Access node 310 may comprise, for example, a macro-cell access node, such as access nodes 110 or 120 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with other network nodes, such as wireless devices and other nodes. For example, wireless devices may initiate retransmission procedures such that the transceivers 313 and antennas 314 receive messages from the wireless devices, for example, over communication links 316 and 318 and pass the messages to a mobility entity in the core network. Further, the transceiver 313 and antenna 314 receive signals from the mobility entity such as an MME or AMF and pass the messages to the appropriate wireless device Scheduler 315 may be provided for scheduling resources based on the presence and performance parameters of the wireless devices. Network 301 may be similar to network 101 discussed above.

In embodiments provided herein, processor 311 may operate to compare a performance parameter of a wireless device, such as SINR to a threshold stored in the memory 312 or in an accessible database to determine if the performance parameter of the wireless device meets the threshold. In embodiments provided herein, meeting the threshold is a triggering event for altering a default retransmission mechanism. For example, HARQ may be the default retransmission mechanism. However, when the performance parameter meets the threshold, the processor 311 may determine that HARQ should be disabled and that the wireless device should rely on another retransmission mechanism, for example RLC or PDCP retransmission mechanisms. The access node 310 may then utilize transceiver 313 and antenna 314 to send an instruction to the wireless device in order to disable HARQ.

Figure 4:
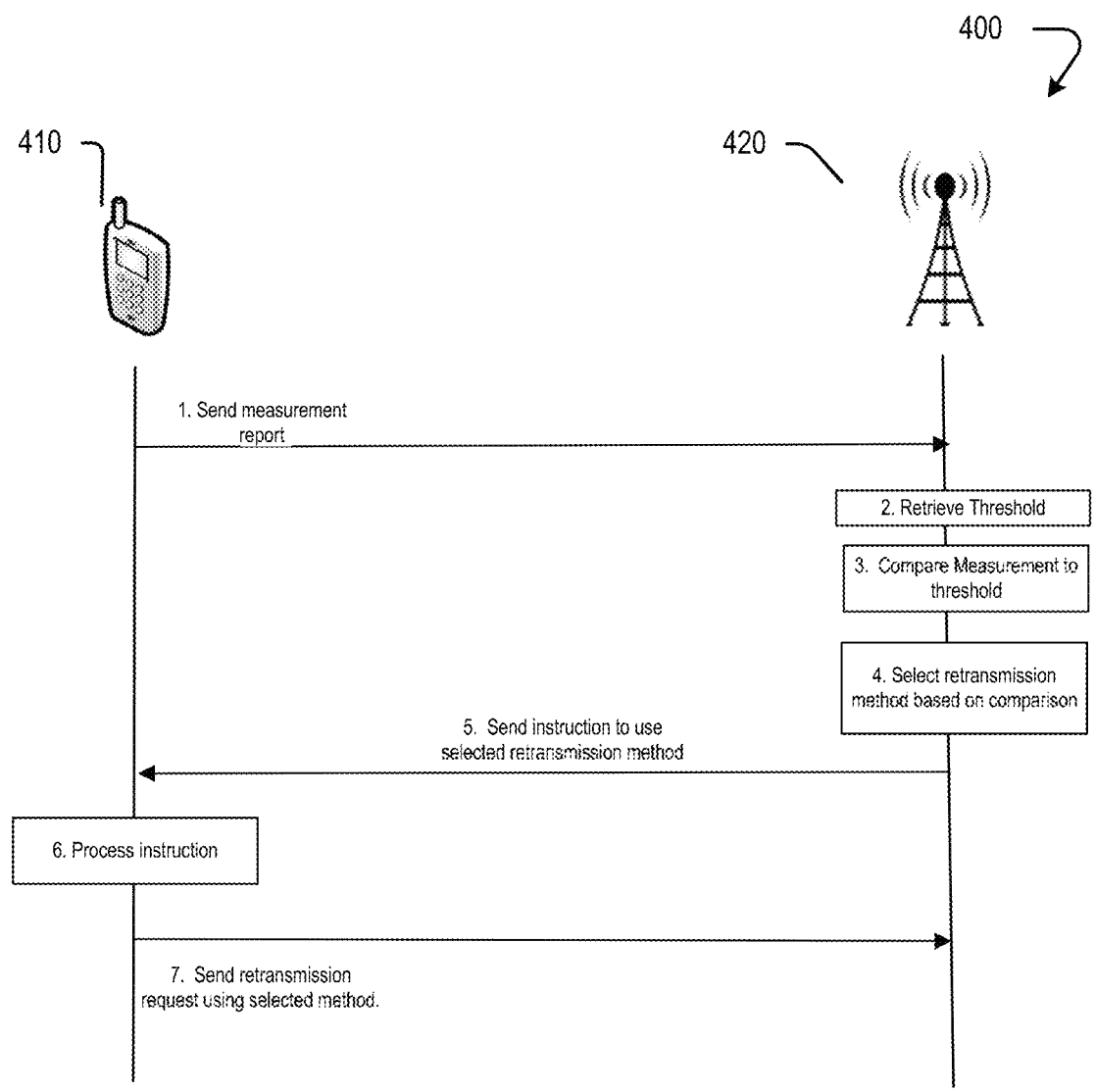
FIG. 4 is a flow diagram depicting an access node and wireless device selecting a retransmission mode in accordance with disclosed embodiments.

FIG. 4 is a flow diagram 400 further illustrating interaction between a wireless device 410 and an access node 420 in accordance with embodiments described herein. In step 1, the access node 420 sends a measurement report including a performance parameter to the access node or base station 420. In step 2, the access node 420 retrieves a performance parameter threshold, and in step 3, the access node 420 compares the received measurement to the stored threshold. In step 4, the access node 420 selects a retransmission method based on the comparison. In step 5, the access node 420 sends an instruction to the wireless devices to use the selected retransmission method.

Upon receipt of the instruction at the wireless device 410, the wireless device processes the instruction in step 6. Subsequently, when a retransmission request is sent by the wireless device 410 in step 7, the wireless device sends the retransmission request using the method selected by the access node 420 as instructed in step 5.

In the scenario described herein, the wireless device 410 may, for example, be moving closer to the access node 420. Thus, at a location close to the access node 420, the wireless device 410 may send a performance parameter that meets a predetermined threshold. Thus, in selecting the retransmission method in step 4, the access node 420 may disable MAC HARQ retransmissions. Accordingly, the instruction may either inform the wireless device 410 that MAC HARQ transmissions have been disabled, and/or instruct the wireless device 410 to utilize a specific retransmission method, such as an RLC retransmission method. However, when the wireless device 410 is further from the access node 420 or an area with interference from a neighboring cell, the performance parameter measured by the wireless device 410 may not meet the predetermined threshold. In this case, the wireless device 410 may continue to use a default retransmission method, which may, for example be HARQ. Accordingly, the procedure described herein may allow the wireless device 410 to use a slower retransmission method and reduce the uplink overhead when the performance parameter of the wireless device meets the threshold.

Figure 5:
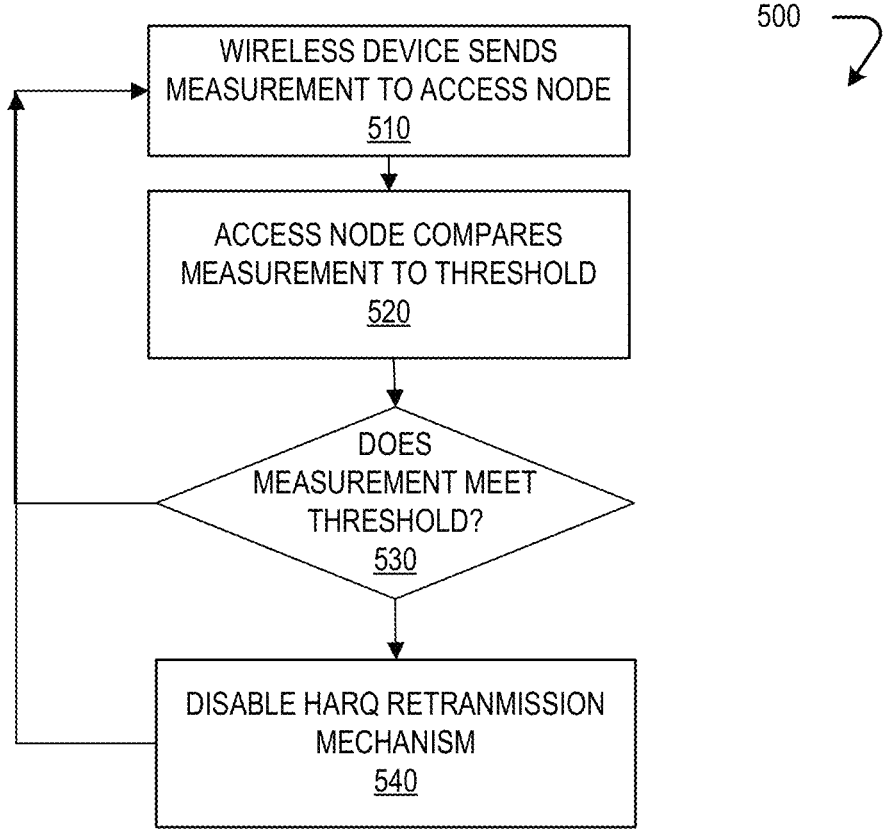
FIG. 5 is a flow chart depicting a method for selecting a retransmission mode in accordance with disclosed embodiments.

The disclosed methods for uplink overhead reduction are further described with reference to FIGS. 5 and 6 below. FIG. 5 illustrates an exemplary method 500 performed by an access node for uplink overhead reduction. Method 500 may be performed by any suitable processor discussed herein, for example, the processor 311 included in the access node 310 or a processor included in a controller node. For the sake of convenience, the method is described as being performed by the access node 420

Method 500 starts in step 510 when the wireless device 410 transmits a measured performance parameter to the access node 420. The measured performance parameter may, for example, be a SINR measurement. The measurement may be made by the wireless device 410 and may be sent periodically by the wireless device 410 to the access node 420. The transmission may be part of a radio resource control (RRC) connect request sent by the wireless device 410 or may be simultaneous with a CSI report. Alternatively, the wireless device 410 may send the performance parameter at a scheduled interval or based on an internally stored threshold of a distance moved, a location reached, a time expired, or other trigger.

In step 520, the access node 420 receives the measurement and compares the measurement to a stored threshold. The threshold may be stored in a database accessible to the access node 420 and may be stored in a memory of the access node. The threshold may be set network wide, or for a specific cell or sector. The threshold may be based, for example, on antenna performance parameters or other network configuration parameters.

In step 530, the access node 420 determines if the measured parameter received from the wireless device 410 meets the stored threshold. For example, if the measured parameter is SINR, when the wireless device 410 is sufficiently close to the access node 420, the measured SINR may meet the stored threshold. If the measured SINR meets the stored threshold in step 530, the access node disables the HARQ retransmission method in step 540, thereby allowing the wireless device 410 to utilize an alternative retransmission mechanism, such as the RLC retransmission method or the PDCP retransmission method. However, if the measured parameter does not meet the stored threshold in step 530, the wireless device 410 continues to use the HARQ retransmission mechanism and continues to periodically update the access node 420 with respect to the measured performance parameter.

Accordingly, in the embodiment described with respect to FIG. 5, uplink overhead is reduced by allowing wireless devices experiencing strong performance to utilize a slower retransmission method, while other wireless devices experiencing less optimal conditions may continue to use HARQ, which is a faster retransmission method.

Figure 6:
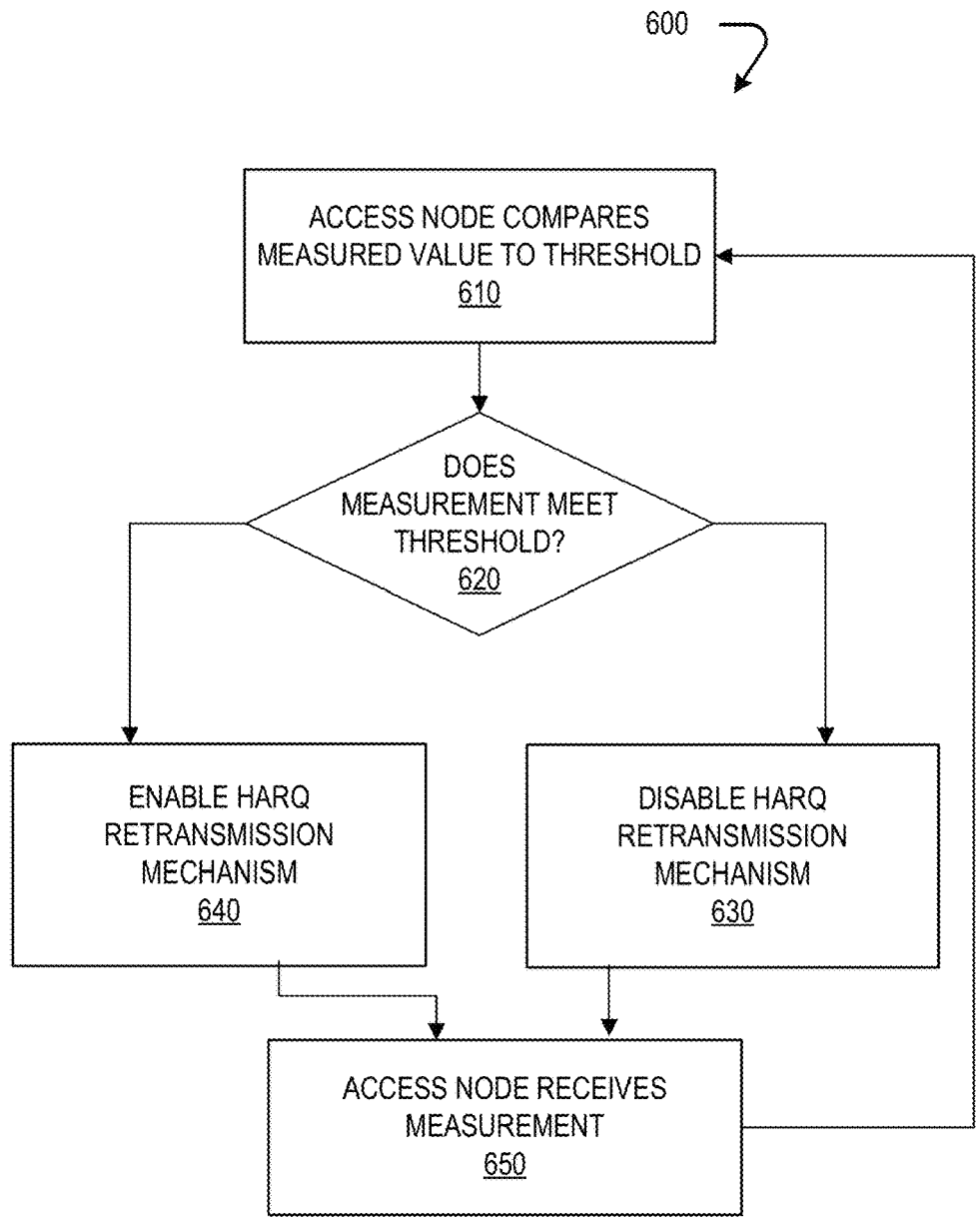
FIG. 6 is a flow chart depicting an additional method for selecting a retransmission mode in accordance with disclosed embodiments.

FIG. 6 illustrates a method 600 for uplink overhead reduction. Method 600 may be performed by an access node, for example by the processor 311 of the access node 310. For the sake of illustration, the method is described as being performed by the access node 420 interacting with multiple wireless devices, such as wireless device 410. Although only one wireless device 410 is shown as interacting with the access node 420, it should be understood that the access node 420 interacts with multiple wireless devices, such as, for example wireless devices 131, 132, and 133.

In some embodiments, the method 600 is only performed after determining that downlink speeds meet a network designated threshold. For example, high uplink activity is common for high downlink speeds, for example, for 50 Mbps and 100 Mbps downlink streams. The high uplink activity is due to channel quality feedback CSI, CQI and MAC HARQ processes overhead.

In step 610, the access node 420 compares the measured performance parameter value to a stored threshold. In embodiments set forth herein, the access node 420 may receive the measured performance parameter from the wireless device 410. However, in other embodiments, the access node 420 may perform its own measurements or retrieve stored measurements.

In step 620, the access node 420 determines if the measured performance parameter meets the stored threshold. For example, the access node 420 may compare a measured value of SINR or RSRP with a stored threshold. If the measured value meets the threshold in step 620, the access node 420 may disable the HARQ retransmission method in step 630. When HARQ is disabled for a particular wireless device, the wireless device may utilize another retransmission mechanism, for example, the RLC retransmission mechanism. While the RLC retransmission mechanism is slower than the HARQ retransmission mechanism, the use of the RLC retransmission mechanism reduces uplink overhead. In some embodiments, the access node 420 sends a message to the wireless device 410 instructing the wireless device 410 that the HARQ retransmission mechanism has been disabled and potentially further instructing the wireless device to utilize the RLC retransmission mechanism.

Alternatively, if the measured performance parameter does not meet the stored threshold in step 620, the access node 420 may enable the HARQ retransmission mechanism in step 640 when the HARQ retransmission mechanism was previously disabled. Thus, in some instances, the wireless device 410 may be moving away from the access node 420 and the performance parameter may no longer meet the predetermined threshold. In this instance, a previously disabled HARQ retransmission mechanism may be enabled by the access node 420 in step 640. Finally, in step 650, the access node 420 continues to receive measured performance parameters from multiple wireless devices or continues to acquire or generate measured performance parameters for the wireless devices communicating with the access node 420.

In some embodiments, methods 500 and 600 may include additional steps or operations. Furthermore, the methods may include steps shown in each of the other methods. As one of ordinary skill in the art would understand, the methods 700 and 800 may be integrated in any useful manner.

By the methods described herein, wireless device performance can be improved by utilizing selective retransmission mechanism for uplink overhead reduction. Further, the customer service level for both 4G and 5G networks will improve in various scenarios.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   determining that a downlink stream speed meets a predetermined speed threshold;
   determining a signal to noise and interference ratio (SINR) at a wireless device;
   comparing the SINR to a predetermined threshold;
   determining the SINR at the wireless device meets the predetermined threshold; and
   disabling a hybrid automatic repeat request (HARQ) retransmission mechanism for the wireless device in response to determining that the SINR at the wireless device meets the predetermined threshold and the downlink stream speed meets the predetermined speed threshold.

2. The method of claim 1, further comprising utilizing a radio link control (RLC) retransmission mechanism for the wireless device.

3. The method of claim 1, further comprising receiving a SINR measurement from the wireless device.

4. The method of claim 1, further comprising storing the predetermined threshold at an access node.

5. The method of claim 1, further comprising determining the SINR at an additional wireless device does not meet the predetermined threshold.

6. The method of claim 5, further comprising utilizing the HARQ retransmission mechanism for the additional wireless device.

7. The method of claim 6, wherein the additional wireless device utilizing the HARQ retransmission mechanism is further from a serving access node than the wireless device.

8. The method of claim 1, further comprising signaling the wireless device from an access node to disable the HARQ retransmission mechanism.

9. The method of claim 8, wherein the access node is a gNodeB.

10. An access node comprising:
    at least one processor performing operations including,
        determining a signal to noise and interference ratio (SINR) at a wireless device;
        comparing the SINR to a predetermined threshold;
        determining the SINR at the wireless device meets the predetermined threshold;
        disabling a hybrid automatic repeat request (HARQ) retransmission mechanism for the wireless device;
        determining the SINR at an additional wireless device further from a serving access node than the wireless device;
        comparing the SINR at the additional wireless device to the predetermined threshold;
        determining the SINR at the additional wireless device does not meet the predetermined threshold; and
        utilizing the HARQ retransmission mechanism for the additional wireless device.

11. The access node of claim 10, the operations further comprising maintaining the HARQ retransmission mechanism at a media access control (MAC) layer.

12. The access node of claim 11, the operations further comprising utilizing a radio link control (RLC) retransmission mechanism for the wireless device.

13. The access node of claim 10, the operations further comprising receiving a SINR measurement from the wireless device.

14. The access node of claim 10, the operations further comprising storing the predetermined threshold at the access node.

15. A non-transitory computer readable medium storing instructions that when executed by a processor cause the processor to perform operations comprising:
    determining that a downlink stream speed meets a predetermined speed threshold;
    comparing a signal to noise and interference ratio (SINR) at a wireless device to a predetermined SINR threshold;
    utilizing a hybrid automatic repeat request (HARQ) retransmission mechanism for the wireless device when the SINR does not meet the predetermined SINR threshold; and
    disabling the HARQ retransmission mechanism for the wireless device when the SINR meets the predetermined SINR threshold and the downlink stream speed meets the predetermined speed threshold.

16. The non-transitory computer readable medium of claim 15, the operations further comprising signaling the wireless device from an access node to disable the HARQ retransmission mechanism.

17. The non-transitory computer readable medium of claim 16, wherein the access node is a gNodeB.

18. The non-transitory computer readable medium of claim 15, the operations further comprising utilizing a radio link control (RLC) retransmission mechanism for the wireless device upon disabling the HARQ retransmission mechanism.

\* \* \* \* \*